US012718589B1

(12) United States Patent
Gardner et al.

(10) Patent No.: US 12,718,589 B1
(45) Date of Patent: Aug. 25, 2026

(54) TECHNIQUES FOR DETECTING AND IDENTIFYING SIGNS IN IMAGES

(71) Applicant: Bentley Systems, Incorporated, Exton, PA (US)

(72) Inventors: Marc-André Gardner, Quebec City (CA); Israël Akobi, Quebec City (CA); Cheikhou Ba, Quebec City (CA); Rania Benrhaiem, Quebec City (CA)

(73) Assignee: Bentley Systems, Incorporated, Exton, PA (US)

( * ) Notice: Subject to any disclaimer, the term of this patent is extended or adjusted under 35 U.S.C. 154(b) by 457 days.

(21) Appl. No.: 17/853,199

(22) Filed: Jun. 29, 2022

(51) Int. Cl.

| | |
|---|---|
| ***G06K 9/00*** | (2022.01) |
| ***G06V 10/25*** | (2022.01) |
| ***G06V 20/58*** | (2022.01) |
| ***G06V 20/62*** | (2022.01) |
| ***G06V 30/10*** | (2022.01) |

(52) U.S. Cl.
CPC ............ *G06V 20/582* (2022.01); *G06V 10/25* (2022.01); *G06V 20/63* (2022.01); *G06V 30/10* (2022.01)

(58) Field of Classification Search
CPC ...... G06V 20/582; G06V 10/25; G06V 30/10; G06V 20/63; G06V 10/454; G06V 10/7788; G06V 10/82; G06V 10/987; G06F 16/53; G06F 16/9024; G06F 18/214; G06F 18/2178; G06F 18/22; G06F 18/24765; G06F 18/41
See application file for complete search history.

(56) References Cited

U.S. PATENT DOCUMENTS

| | | | |
|---|---|---|---|
| 8,041,080 B2 | 10/2011 | Porikli et al. | |
| 9,418,303 B2 | 8/2016 | Zobel | |
| 9,501,703 B2 | 11/2016 | Oh et al. | |
| 10,928,828 B2 | 2/2021 | Xu et al. | |
| 2007/0171431 A1* | 7/2007 | Laflamme ............. | G01C 11/02 356/602 |
| 2009/0074249 A1* | 3/2009 | Moed .................. | G06V 20/582 382/104 |

(Continued)

OTHER PUBLICATIONS

Cao, Jingwei, et al., "Improved Traffic Sign Detection and Recognition Algorithm for Intelligent Vehicles," MDPI, Sensors, vol. 19, No. 4021, Sep. 18, 2019, pp. 1-21.

(Continued)

*Primary Examiner* — Michael J Vanchy, Jr.
(74) *Attorney, Agent, or Firm* — Cesari and McKenna, LLP; James A. Blanchette

(57) ABSTRACT

In example embodiments, a software application may implement techniques for detection and identification of physical objects such as signs in images. The techniques may a) decouple detection of the physical objects (e.g., signs) and their meta-classes from identification of information about the physical objects such as their specific technical name, b) use weakly supervised training to train a ML detection model to detect the physical objects (e.g., signs) and their meta-classes using image-wise meta-class labeled training images and/or c) use a combination of textual clues from OCR and visual clues from keypoint matching of image descriptors to identify the information (e.g., specific technical name) of each physical objects (e.g., sign) once it has been assigned a meta-class.

14 Claims, 8 Drawing Sheets

(56) References Cited

U.S. PATENT DOCUMENTS

| | | | | |
|---|---|---|---|---|
| 2014/0294291 | A1* | 10/2014 | Zhang | G06V 10/774 382/159 |
| 2017/0193313 | A1 | 7/2017 | Kudana et al. | |
| 2019/0384981 | A1* | 12/2019 | Swaminathan | G06F 18/2431 |
| 2021/0019547 | A1* | 1/2021 | Vishal | G06V 10/764 |
| 2021/0350150 | A1* | 11/2021 | An | G06V 30/1902 |
| 2022/0316906 | A1* | 10/2022 | Hoppenot | G01C 21/3682 |
| 2023/0058082 | A1* | 2/2023 | Kim | G06V 10/7788 |

OTHER PUBLICATIONS

Ibrahem, Hatem, et al., "Weakly Supervised Traffic Sign Detection in Real Time Using Single CNN Architecture for Multiple Purposes," IEEE, 2020 IEEE International Conference on Consumer Electronics (ICCE), Las Vegas, NV, USA, Jan. 4-6, 2020, pp. 1-4.
Kovács, Levente, et al., "Hungarian Traffic Sign Detection and Classification using Semi-Supervised Learning," IEEE, SACI 2021, IEEE 15$^{th}$ international Symposium on Applied Computational Intelligence and Informatics (SACI), Timioara, Romania, May 19-21, 2021, pp. 000437-000442.
Moon, Yoochan, et al., "Deep Learning-Based Method to Recognize Line Objects and Flow Arrows from Image-Format Piping and Instrumentation Diagrams for Digitization," MDPI, Applied Sciences, vol. 11, No. 10054, Oct. 27, 2021, pp. 1-21.
Nartey, Obed Tettey, et al., "Robust Semi-Supervised Traffic Sign Recognition via Self-Training and Weakly-Supervised Learning," MDPI, Sensors, vol. 20, No. 2684, May 8, 2020, pp. 1-24.
Pandey, Pranjali, et al., "Traffic Sign Detection Using Template Matching Technique," IEEE, 2018 Fourth International Conference on Computing Communication Control and Automation (ICCUBEA), Pune, India, Aug. 16-18, 2018, pp. 1-6.
Qian, Rongqiang, et al., "Traffic Sign Detection by Template Matching based on Multi-Level Chain Code Histogram," IEEE, 2015 12$^{th}$ International Conference on Fuzzy Systems and Knowledge Discovery (FSKD), Zhangjiajie, China, Aug. 15-17, 2015, pp. 2400-2404.
Rosebrock, Adrian, "Multi-template Matching with OpenCV," PyImageSearch, pyimagesearch, <https://pyimagesearch.com/2021/03/29/multi-template-matching-with-opencv/>, Mar. 29, 2021, pp. 1-15.
Swaroop, Paridhi, et al., "An Overview of Various Template Matching Methodologies in Image Processing," International Journal of Computer Applications (0975-8887), IJCA™, vol. 153, No. 10, Nov. 2016, pp. 8-14.
Wu, Yihui, et al., "Traffic Sign Detection Based on Convolutional Neural Networks," IEEE, The 2013 International Joint Conference on Neural Networks (IJCNN), Dallas, TX, USA, Aug. 4-9, 2013, pp. 1-7.
Yang, Luhui, et al., "Traffic Sign Classification via Semi-Supervised Model with Uncertain Labels," IEEE, 2020 IEEE 18th International Conference on Industrial Informatics (INDIN), Warwick, United Kingdom, Jul. 20-23, 2020, pp. 926-931.
Zhu, Yingying, et al., "Traffic Sign Detection and Recognition Using Fully Convolutional Network Guided Proposals," Elsevier B. V., Elsevier, ScienceDirect, Neurocomputing, vol. 214, Jul. 20, 2016, pp. 758-766.

* cited by examiner

FIG. 5
500
Parking Sign
Warning Sign
510
520

TECHNIQUES FOR DETECTING AND IDENTIFYING SIGNS IN IMAGES

BACKGROUND

Technical Field

The present disclosure relates generally to machine learning, and more specifically to application of machine learning to the detection and identification of physical objects such as signs (e.g., traffic signs) in images (e.g., street view images).

Background Information

Sign inspection is an important part of ensuring safe and efficient utilization of infrastructure. For instance, traffic sign inspection is an important part of ensuring drivers can safely and efficiently use roadways. An initial step of sign (e.g., traffic sign) inspection is to create an inventory of deployed signs with their geographical locations. While such an inventory of signs could be created manually, it is highly desirable to be able to create such an inventory in an automated manner from various available data sources. One available data source is images (e.g., street view images) captured by camera-equipped vehicles (e.g., camera-equipped automobiles, railway vehicle, ground or aerial autonomous vehicles (AVs), etc.). Such vehicles may capture images at regular intervals (e.g., every few feet along a roadway, railway, etc.) as well as record position and orientation information for where the images were captured (e.g., the geographic coordinates and orientation of the camera). If automated techniques could effectively detect the presence of signs in sets of images and precisely identify them, the signs could be associated with geographic locations calculated from the position and orientation information, and an inventory of signs could be efficiently created.

Various computer vision and machine learning (ML) approaches have been attempted, or potentially could be attempted, to detect and identify signs in images. These approaches include template matching approaches, fully supervised ML approaches and semi-supervise ML approaches. However, such approaches may struggle to address the particular challenges inherent to the task of detecting and identifying signs.

There is typically a very large number of sign types and large similarity between them. Given the target audience of sign inventories, it is desirable to identify signs by their specific technical names (rather than by their generic or colloquial names). As used herein, the term "specific technical name" refers to an identifier used in an official manual or other official data source. Typically, a specific technical name is particular to the jurisdiction (e.g., country) in which the sign in located. For example, for U.S. traffic signs, the specific technical name may be the identification code provided in the Manual on Uniform Traffic Control Devices (MUTCD) (commonly referred to as a "MUTCD code"). An example MUTCD code for a sign that could be referred to generically as a "warning sign" or colloquial as "a stop sign slightly larger than usual" may be "SP-037-22."

Official manuals (such as the MUTCD) and other similar official data sources often define many types of signs that are very similar to each other, differing in only very subtle ways. For example, the 2011 MUTCD defines more than 800 federal traffic signs (as well as large numbers of additional state-specific traffic signs) many of which share significant similarities. FIG. 1 is a depiction of two traffic signs 110, 120 in the MUTCD. While quite similar, the first sign 110 has a MUTCD code of "R9-23aL", while the second sign 120 has a different MUTCD code of "R9-23bL." This may present challenges in training ML models and in achieving the desired results from them.

There are typically high training costs associated with the above mentioned approaches for detecting and identifying signs. Many ML approaches require large numbers of labeled training images covering each type of sign. For example, some approaches may require at least 20 labeled training images per type of sign. Since there may be large numbers of different types of signs (e.g., over 800 federal traffic signs in the MUTCD), if one desired to train a ML model to identify all defined signs, it could require huge numbers of labeled training images (e.g., 16,000 (i.e. 800*20) labeled training images). The creation of such labeled training images may consume significant resources. Conventionally, there has been a requirement for a human labeler to label each image object-wise. "Object-wise" labeling refers to identifying the exact position (e.g., with a bounding box) and information (e.g., specific technical name) of each object (e.g., sign) that appears in an image. FIG. 2 is a diagram 200 illustrating an object-wise labeled training image. In this example, the image includes six signs each of which a human labeler has identified with its own bounding box 210-260, and associated with its own MUTCD code (materialized in this example by the border pattern around each sign).

Object-wise labeling may take a minute or more per image. If there are large numbers of labeled training images required (e.g., 16,000 for the example mentioned above) at a minute per image this could require excessive person-hours of labeling work (e.g., at a minute per image for the example, over 266 person-hours). Compounding these burdens, labeled training images may need to be repeatedly created, for example, for each jurisdiction (e.g., country) in which the ML model is to be used.

Accordingly, there is a need for improved techniques for detection and identification of physical objects such as signs in images.

SUMMARY

In example embodiments, a software application may implement improved techniques for detection and identification of physical objects such as signs (e.g., traffic signs) in images (e.g., street view images). The techniques may address the above discussed challenges as well as achieve additional advantages by a) decoupling detection of the physical objects (e.g., signs) and their meta-classes from identification of information about the physical objects such as their specific technical name, b) using weakly supervised training to train a ML detection model to detect the physical objects (e.g., signs) and their meta-classes using image-wise meta-class labeled training images (e.g., rather than object-wise information (e.g., specific technical name) labeled training images) and/or c) using a combination of textual clues from object character recognition (OCR) and visual clues from keypoint matching of image descriptors to identify the information (e.g., specific technical name) of each physical object (e.g., sign) once it has been assigned a meta-class. An output may be used for a variety of purposes, for example, combined with geographic locations calculated from the position and orientation information to generate an inventory.

Among a variety of advantages, the improved techniques may be well suited for use with large numbers of fairly similar physical objects (e.g., signs), enabling more accurate detection and identification. They also may substantially reduce resource consumption in training. A human labeler may require only 3-4 seconds to image-wise meta-class label a training image (e.g., as opposed to about 1 minute with prior techniques), greatly reducing person-hours of labeling work. Further, at least some learning may be retained despite slightly different physical object (e.g., sign) definitions, for example, across jurisdictions (e.g., countries), further reducing training burdens.

In one example embodiment, software executing on one or more computing devices may receive an image that includes one or more signs. A trained ML detection model of the software predicts a position in the image and a meta-class of each of the one or more signs. The software then produces one or more textual predictions, one or more visual predictions or both one or more textual predictions and one or more visual predictions of a specific technical name of each sign based on a comparison of text or graphics extracted from a region of the image at the position of the sign and information for signs in the reference database that share the same meta-class as the sign. The software combines any textual predictions and any visual predictions for each sign to produce one or more final predictions of each sign's specific technical name and outputs the position in the image and the specific technical name of each sign.

In another example embodiment, software executing on one or more computing devices may receive an image that includes one or more physical objects (which may be signs or other physical things). A trained ML detection model of the software predicts a position in the image and a meta-class of each of the one or more physical objects. The software then produces one or more textual predictions, one or more visual predictions or both one or more textual predictions and one or more visual predictions of information for each physical object based on a comparison of text or graphics extracted from a region of the image at the position of the physical object in the image and information for physical objects in the reference database that share the same meta-class as the physical object. The software combines any textual predictions and any visual predictions for each physical object to produce one or more final predictions and outputs the position in the image and the final prediction of each physical object.

In yet another example embodiment, executable instructions on one or more processors of one or more electronic devices receive an image that includes one or more signs and proceeds to predict a position in the image and a meta-class of each of the one or more signs using a trained ML detection model. The instructions extract text from each region of the image at the position using an OCR algorithm, and compares, for each sign, the extracted text to reference text of signs in the reference database that share the same meta-class as the sign to produce one or more textual predictions of a specific technical name. The instructions then output the position in the image and the specific technical name of each sign.

It should be understood that a variety of additional features and alternative embodiments may be implemented other than those discussed in this Summary. This Summary is intended simply as a brief introduction to the reader and does not indicate or imply that the examples mentioned herein cover all aspects of the disclosure or are necessary or essential aspects of the disclosure.

BRIEF DESCRIPTION OF THE DRAWINGS

The description below refers to the accompanying drawings of example embodiments, of which.

DETAILED DESCRIPTION

Figure 3:
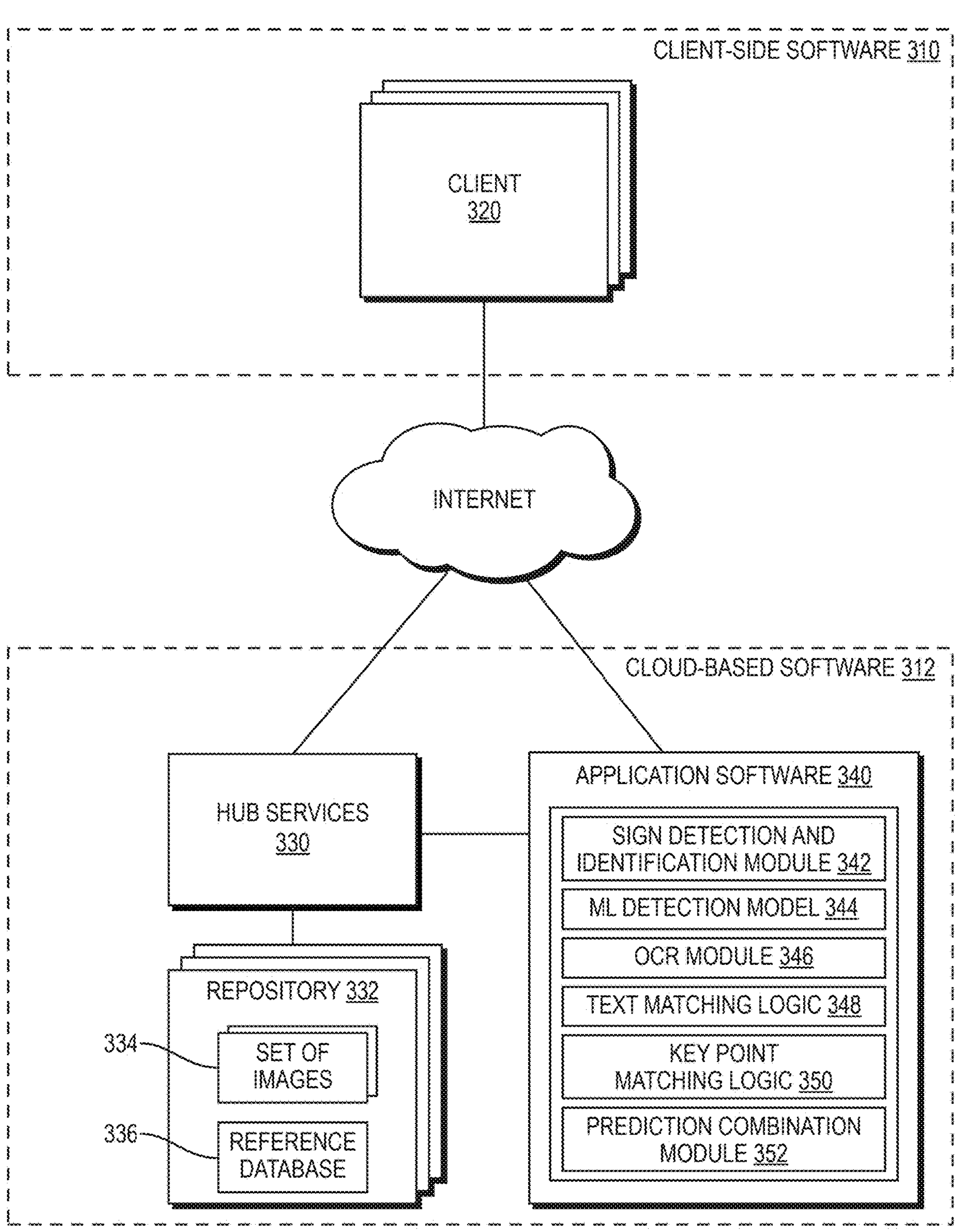
FIG. 3 is a high-level block diagram of an example software architecture in which a sign detection and identification module may be implemented.

FIG. 3 is a high-level block diagram of an example software architecture in which a sign detection and identification module may be implemented. The architecture may be divided into client-side software 310 executing on one or more computing devices arranged locally (collectively "client devices") and cloud-based software 312 executing on one or more remote computing devices ("cloud computing devices") accessible over the Internet.

The client-side software 310 may include client software applications (or simply "clients") 320 operated by users. The clients 320 may be of various types, including desktop clients that operate directly under an operating system of a client device and web clients that operate within a web browser. The clients 320 may handle a number of operations (e.g., often non-processing intensive operations), for example, providing user interfaces that supply input to and display information received from the cloud-based software 312.

The cloud-based software 312 may include hub services software 330 that maintains repositories 332 that store data as well as application software 340 that uses the data. The data may include set of images (e.g., street view images) 334 captured by camera-equipped vehicles (e.g., camera-equipped automobiles, railway vehicle, ground or aerial AVs, etc.). The sets of images 334 may be subdivided into sets of images used for training and sets of images used for prediction. The sets of images 334 may also include images used for analysis. In some cases, the images of a set may be captured at regular intervals (e.g., every few feet along a roadway, railway, etc.). The data may also include a reference database 336 that includes information of an official manual (e.g., the MUTCD). Such information may include specific technical names (e.g., MUTCD code) of signs, reference text found on each sign, reference image descriptors (e.g., Speeded-Up Robust Features (SURF), scale-invariant feature transform (SIFT), Oriented FAST and Rotated BRIEF (ORB), etc. descriptors) that describe the visual appearance of the signs, and/or other information. To improve efficiency, the reference database 336 may be preconstructed.

The application software 340 may include functionality to generate an inventory of deployed signs with their geographical locations. In one implementation, the application software 340 may be SignTrack® software available from Bentley Systems, Inc. of Exton PA. Alternatively, the application software 340 may be AssetWise® software available from Bentley Systems, Inc., or another software package available from another vendor. To generate the inventory of deployed signs the application software 340 may use a sign detection and identification module 342 that implements improved techniques for detection and identification of signs. Such module 342 may utilize a number of sub-modules to implement various portions of the technique, including a ML detection model 344, an OCR module 346, text matching logic 348, a key point matching logic 350, and a prediction combination module 352.

In general, the sub-modules 344-352 may decouple the detection of a sign and its meta-classes from the identification of the specific technical name (e.g., MUTCD code) of the sign during prediction. In this context, a "meta-class" refers to a class of objects (e.g., signs) having generally similar appearance, but not necessarily being all of the same type (e.g., as defined by specific technical name). For example, a meta-class of traffic signs may be "warning signs", and such meta-class may include several dozen specific types of signs that have different MUTCD codes that share a generally similar appearance. Such a meta-class may be distinct, for example, from a "parking signs" meta-class, whose signs generally appear quite different. The ML detection model 344 may be trained to predict the position of signs in images and the meta-classes of each of the signs. By predicting meta-classes (rather than specific technical names) the number of categories the ML detection model 344 needs to distinguish is reduced, and the visual differences between categories is increased. This may improve detection accuracy and address issues which have caused prior ML models to fail to produce meaningful results. The exact definition of meta-classes may vary and still achieve these benefits. While examples of "warning signs" and "parking signs" are provided above, the exact definition can depend on needs of the specific task at hand, and performance of the ML detection model 344 is not dependent on one particular set of meta-class definitions.

The ML detection model 344 may be trained to detect the signs and their meta-classes using weakly supervised training with image-wise meta-class labeled training images (e.g., rather than object-wise specific technical name labeled training images). In traditional fully supervised training it was typically necessary for a human labeler to identify the specific technical name of each sign that appears in an image and associate it with an exact position (e.g., with a bounding box). In weakly-supervised training, the human labeler may simply identify a meta-class that appears one time or more in the image, and associate the meta-class with the image as a whole. The meta-class may appear a single time in the image or multiple times in the image. In either case, the human labeler may simply add a tag indicating the meta-class is present in the image. Use of image-wise meta-class labeling may decrease training burden (e.g. from about 1 minute to 3-4 seconds per image), as the user may choose from among a smaller number of categories (i.e. a handful of meta-classes verses potentially hundreds of specific technical names) and does not need to specify exact position (e.g., with a bounding box).

Despite use of image-wise information in training, the ML detection model 344 may be capable of returning exact position and size in an image (e.g., defined by a bounding box) during prediction. To do this, the ML detection model 344 may employ a special instance-aware, context-focused weakly-supervised object detection architecture. In one implementation, the architecture is a modified Wetectron architecture, however, it should be understood that other architectures may be utilized to provide such capability.

During prediction, the ML detection model 344 may pass the obtained position, size, and meta-class of each sign in an image to the other modules 346-352 that identify the sign's specific technical name (e.g., MUTCD code). The modules 346-352 may use a combination of textual clues from OCR and visual clues from keypoint matching of image descriptors to identify the specific technical name. The OCR module 346 may extract text (if any) from a region of the image at the position of the sign (e.g., defined by a bounding box). For this text extraction, the OCR module 346 may utilize any of a number of OCR algorithms, for example, a Microsoft® Form Recognizer OCR algorithm, a Tesseract OCR algorithm, or another OCR algorithm.

If text is present, the text matching logic 348 may compare the extracted text to reference text in the reference database 336 to produce one or more textual predictions of a specific technical name and a confidence level for each textual prediction. The comparison may be limited to reference text of signs in the reference database 336 that belonging to the same meta-class, in order to improve efficiency. The text matching logic 348 may use any of a number of matching algorithms to produce the textual prediction, for example, a fuzzy matching algorithm, a Levenshtein or edited distance algorithm, or another algorithm.

The keypoint matching logic 350 may extract image descriptors (e.g., SURF, SIFT, ORB, etc. descriptors) of graphics (if any) from the region of the image (e.g., defined by a bounding box) and apply a keypoint matching algorithm to match such image descriptors against reference image descriptors in the reference database 336 to produce one or more visual predictions of a specific technical name and a confidence level for each visual prediction. The matching may be limited to reference image descriptors of signs in the reference database 336 that belong to the same meta-class, in order to improve efficiency. The keypoint matching logic 350 may use any of a number of keypoint matching algorithms to produce the visual prediction, for example, a Random Sample Consensus (RANSAC) algorithm, a Progressive Sample Consensus (PROSAC) algorithm, a graph-cut RANSAC algorithm, a Fast Library for Approximate Nearest Neighbors (FLANN) algorithm, or another keypoint matching algorithm.

The prediction combination module 352 may combine any textual predictions and visual predictions to produce one or more final prediction of each sign's specific technical name (e.g., MUTCD code) with an overall confidence level. To combine the predictions, the prediction combination module 352 may employ a merging algorithm that looks to the intersection between the textual predictions and visual predictions, high individual confidence levels of given textual predictions or visual predictions and/or high combined confidence levels of coinciding textual predictions and visual predictions.

Figure 4:
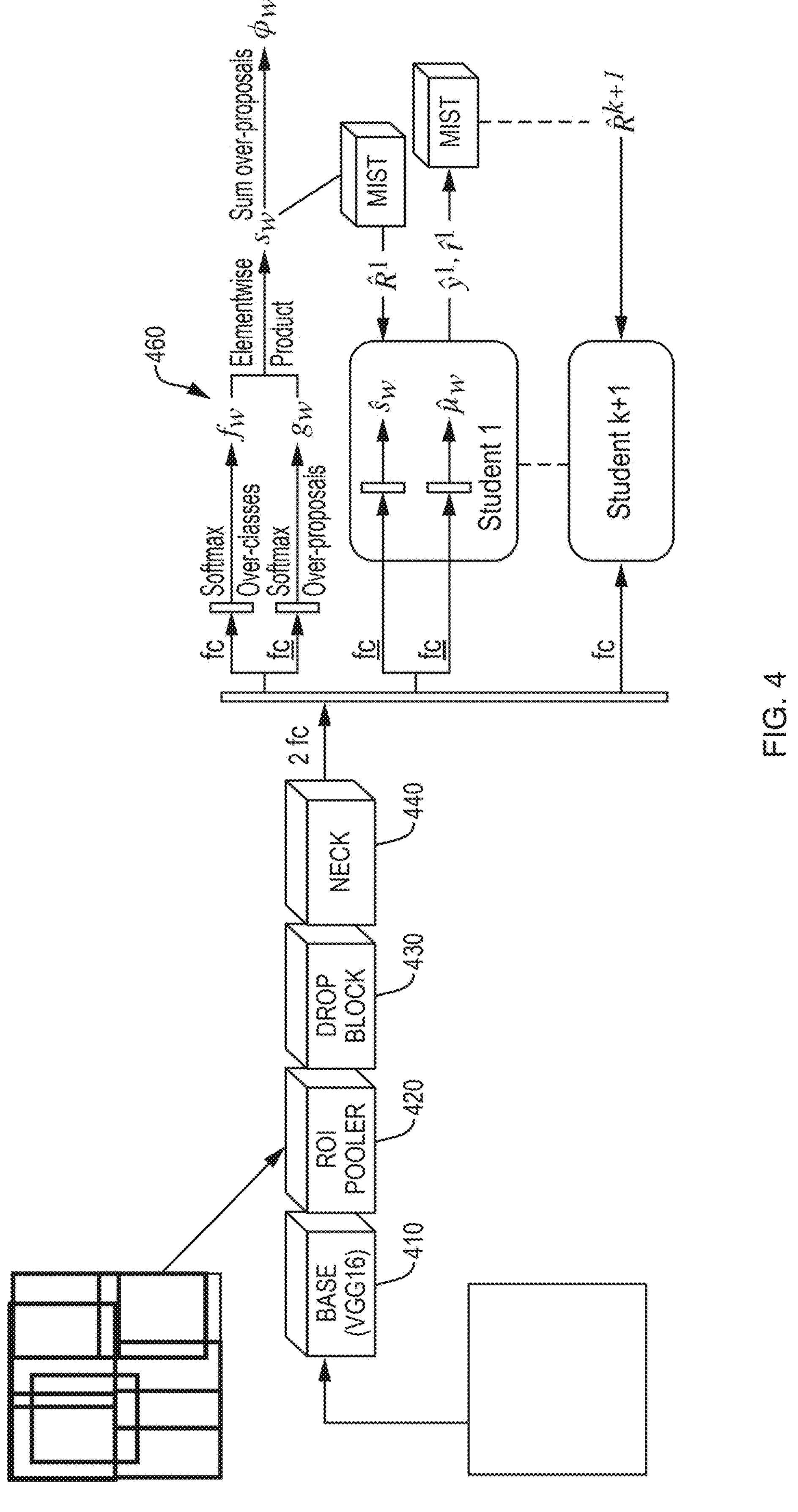
FIG. 4 is an example instance-aware, context-focused weakly-supervised object detection architecture (e.g., modified Wetectron architecture) that may be employed in a ML detection model.

FIG. 4 is an example instance-aware, context-focused weakly-supervised object detection architecture (e.g., modified Wetectron architecture) 400 that may be employed in the ML detection model 344 of FIG. 3. During training and prediction, images from sets of images 334 may be received by a base network 410. The base network 410 may include convolutional layers of a VGG16 neural network model. Traditionally, 3×3 kernel-sized filters are employed in the VGG16 neural network model. When implemented in the ML detection model 344, the reception filter of at least the first convolutional layer may be increased, for example, to 7×7, to better accommodate different aspect ratios and signs of various sizes.

The base network 410 may be coupled to a region of interest (ROI) pooler 420 that computes region-level features. The standard ROI pooler used in the Wetectron architecture typically uses a detection proposal that has the same probability of appearing anywhere in the image. When implemented in the ML detection model 344, however, the ROI pooler may be modified such that the detection proposal has a differing probability depending on image location. For example, probability may be reduced for areas near the bottom of the image (e.g., showing objects near the ground) where the probability of appearance of signs (e.g., traffic signs) is typically low. This may improve computation efficiency, as fewer operations are performed on areas of an image where signs are unlikely to be found.

The ROI pooler 420 may be coupled to a drop block 430 that implements spatial dropout to avoid mistaken detection of only the most discriminative parts of objects rather than their full extent. The Wetectron architecture typically employs a structured drop block where spatial points on ROIs are sampled randomly as blob centers, and regions around these centers are dropped. Feature values may then be re-scaled by a factor of the area of the whole ROI over the area of the un-dropped region.

The drop block 430 may be coupled to a neck network 440. The neck network 440 may include the fully-connected layers of a VGG16 neural network model. To update parameters of the neck network 440. ROI features may be split into sub-batches and back-propagation performed on each sub-batch sequentially.

Training may be performed using a student-teacher distillation process 450. The Wetectron architecture typically encapsulates a classification layer and a regression layer into student blocks 460, where such layers are jointly optimized using pseudo labels. Multiple student blocks may be stacked with the generated pseudo label from each block provided to the next student block. The loss function used in training in the traditional Wetectron architecture typically assumes that at least one object (in this context, at least one sign) is present in each image. When implemented in the ML detection model 344, however, the loss function may be modified to extract knowledge from images that do not include an object (e.g., sign). This may be achieved by adding a term to the loss function that activates only when no class is present (e.g., penalize the model at predicting anything in such images) and by adding a penalty to the model proportional to class presence (e.g., to be maximized if a class is present, but minimized when it is not). A ML detection model 344 built according to the architecture 400 may be trained to predict the appearance of a given meta-class by looking at the differences between images labeled as containing the meta-class and images that are not. Given a sufficiently large number of images, the ML detection model 344 can learn by elimination to predict the presence of each meta-class and the position at which it occurs in an image.

Figure 1:
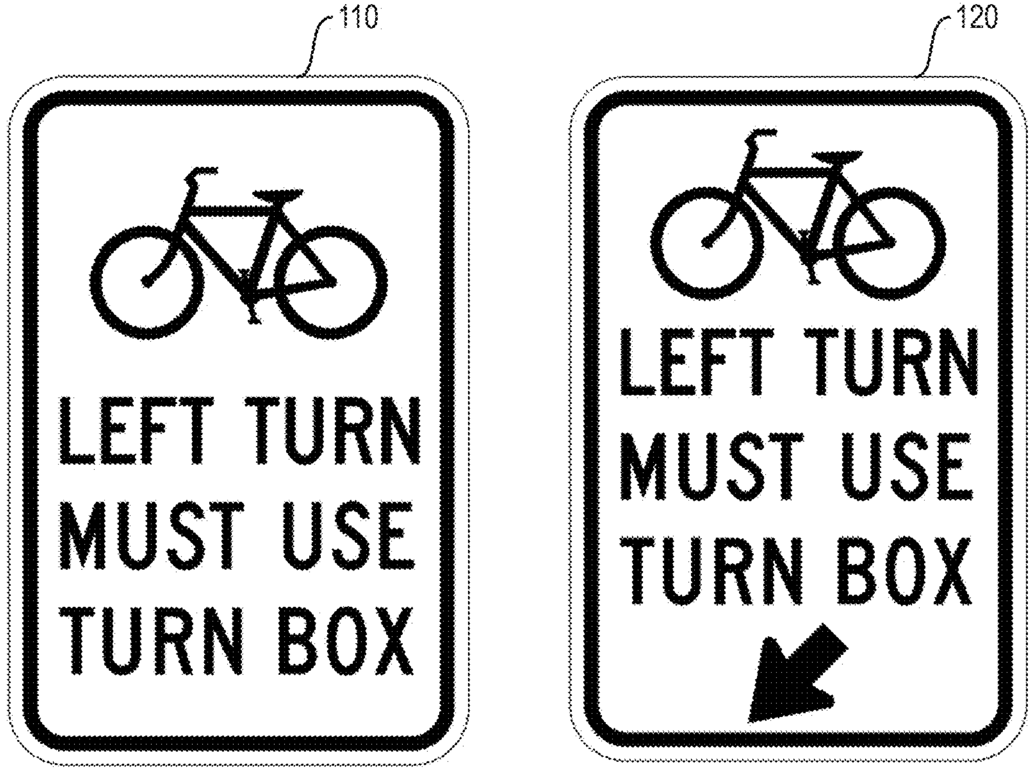
FIG. 1 is a depiction of two traffic signs in the MUTCD.
Figure 2:
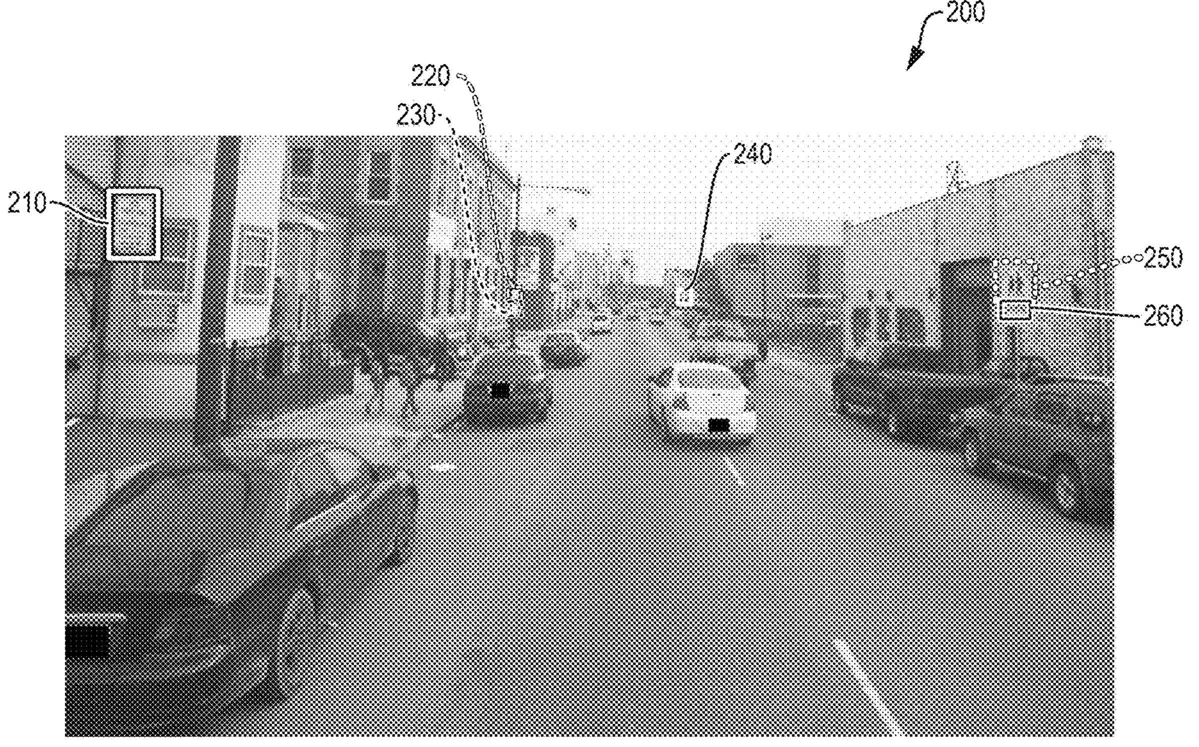
FIG. 2 is a diagram illustrating an object-wise labeled training image.
Figure 5:
FIG. 5 is a diagram illustrating an image-wise meta-class labeled training image that may be used to train a ML detection model.

FIG. 5 is a diagram 500 illustrating an image-wise meta-class labeled training image 500 that may be used to train the ML detection model 344. The image is of the same scene as the object-wise labeled training image of FIG. 2, including six signs. Here, however, a human labeler has simply labeled two meta-classes as appearing in the image, materialized in this example by a "Parking Sign" tag 510 and a "Warning Sign" tag 520. In comparison to FIG. 2, the labeling burden has been reduced from drawing six bounding boxes and selecting MUTCD codes from hundreds of options, to selecting two meta-classes (e.g., from among a short list of meta-classes).

Figure 6:
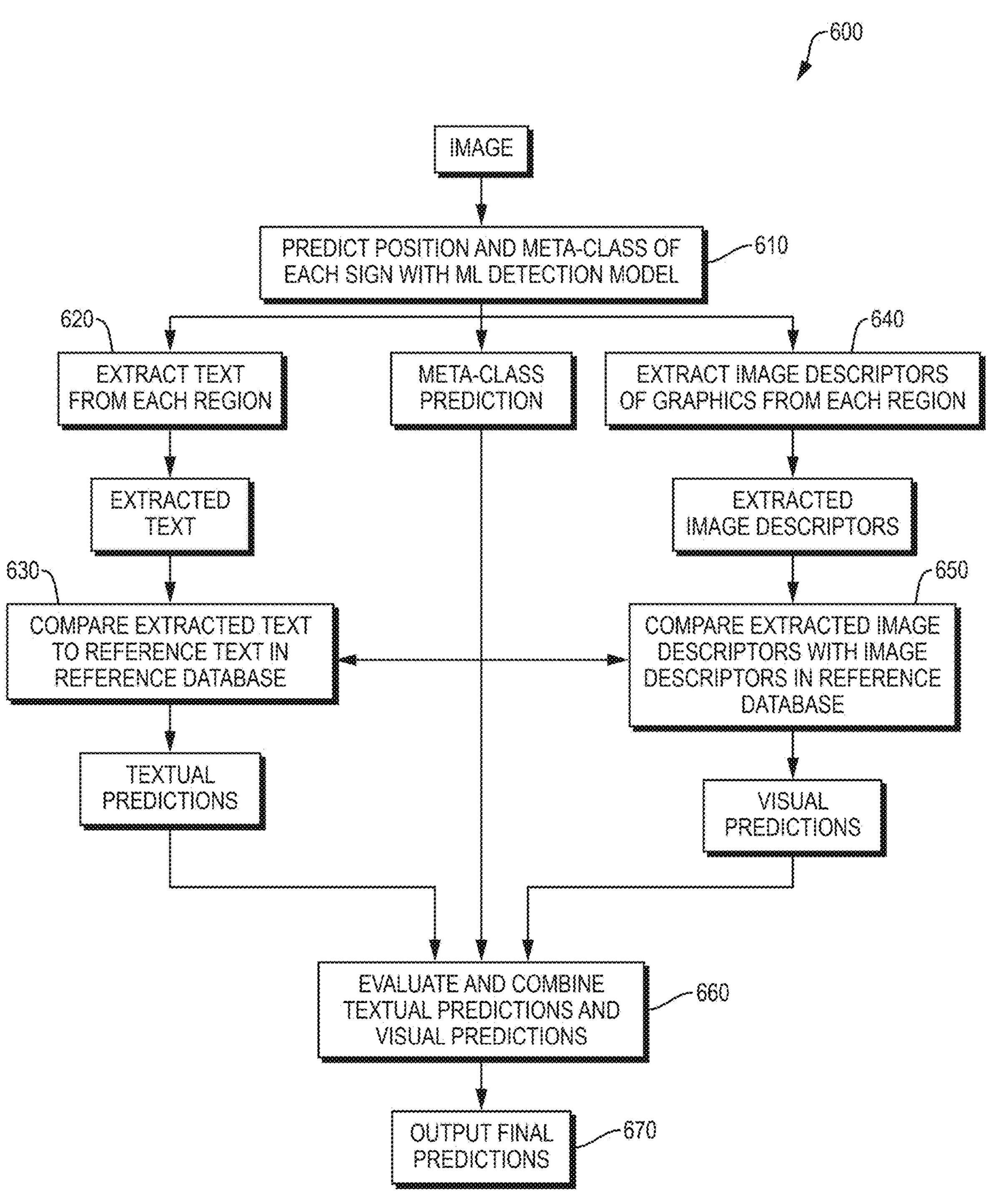
FIG. 6 is a flow diagram of a method for detection and identification of signs in images.
Figure 7:
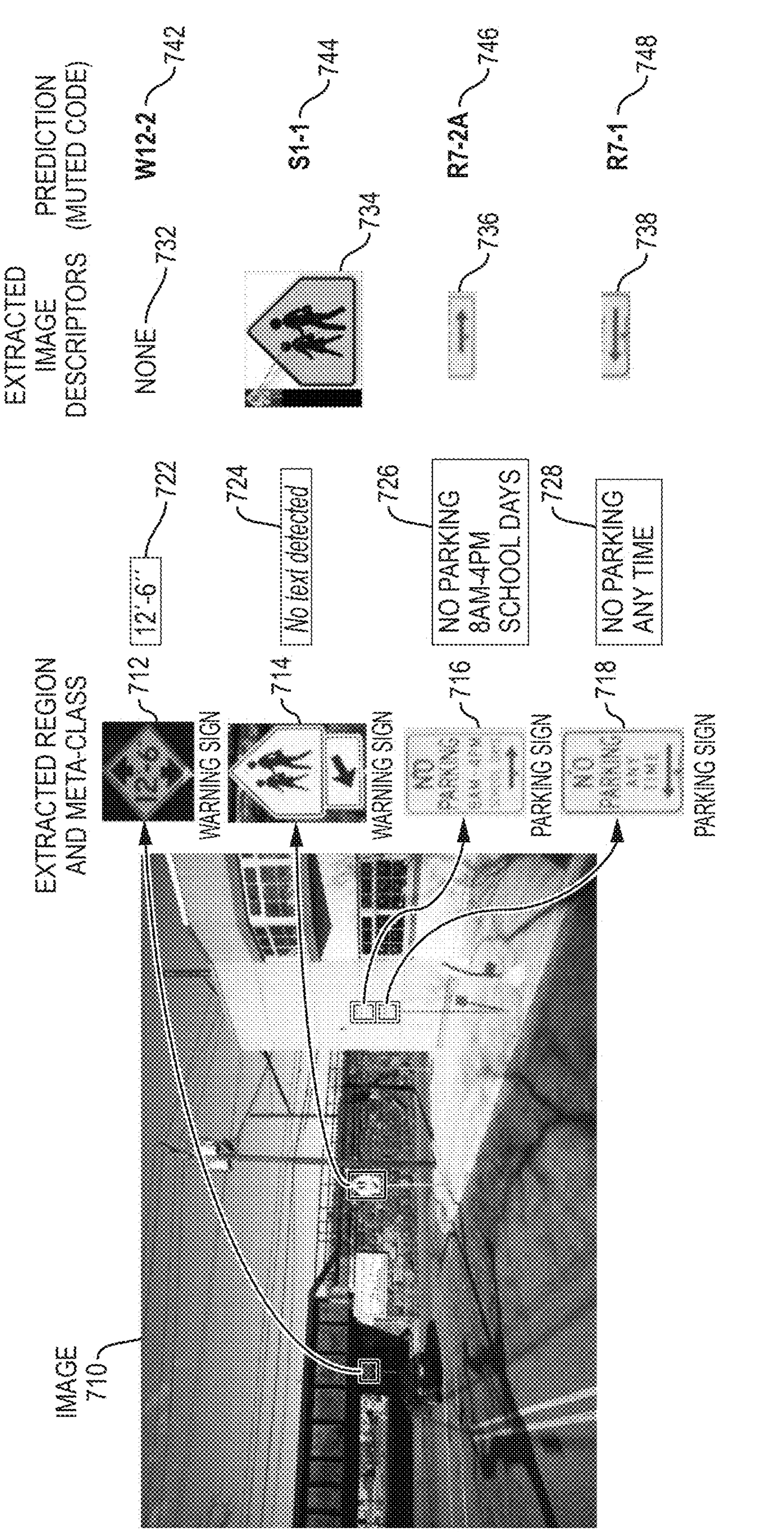
FIG. 7 is a diagram of an example image including a number of signs and extracted information and predictions.

FIG. 6 is a flow diagram 600 of a method for detection and identification of signs (e.g., traffic signs) in images (e.g., street view images) that may use the submodules 344-352 of the detection and identification module 342 of FIG. 3. In this flow diagram it should be assumed that the ML detection model 344 has already been trained with one or more sets of images 334 labeled image-wise with meta-classes. FIG. 7 is a diagram of an example image 710 including a number of signs and extracted information and predictions, which may provide an example of the operation of various steps of the flow diagram 600 of FIG. 6.

The flow diagram 600 begins with the sign detection and identification module 342 accessing an image from a sets of images 334 that requires prediction. At step 610, the trained ML detection model 344 predicts the position in the image (e.g., with a bounding box) and the meta-class of each sign. For each sign, a region of the image at the position (e.g., within the bounding box) is extracted (e.g., cropped to) and this extracted region output together with the respective meta-class. For instance, referring to the example in FIG. 7, the ML detection model 344 may predict a bounding box around each of four signs in the example image 710. For each sign, the region 712-718 of the image within the bounding box is extracted and associated with either the meta-class "Warning sign" or "Parking sign", as the case may be.

At step 620, the OCR module 346 extracts text (if any) from each region to obtain textual clues about each sign's specific technical name (e.g., using a Microsoft® Form Recognizer OCR algorithm, a Tesseract OCR algorithm, or another OCR algorithm). For instance, referring to the example in FIG. 7, the OCR module 346 may extract the text "12'-6"" 722 from the region 712 of the first sign, no text 724 from the region 714 of the second sign, the text "NO PARKING 8 AM-4 PM SCHOOL DAYS" 726 from the region 716 of the third sign, and the text "NO PARKING ANY TIME" 728 from the region 718 of the fourth sign. It should be understood that such text extraction is not always perfect, and the extracted text may sometimes include OCR errors (e.g., a confusion between a "B" and an "8" and the like).

At step 630, for each region that has extracted text, the matching logic 348 compares the extracted text to reference text of signs in the reference database 336 and returns one or more matches to produce one or more textual predictions of a specific technical name (e.g., MUTCD code) and a confidence level for each textual prediction. To improve efficiency, the matching logic 348 may leverage the already-predicted meta-classes, and limit comparisons to reference text of signs in the reference database 336 that belong to the same meta-classes. The produced textual predictions and confidence levels may be provided to the prediction combination module 352. In order to accommodate possible OCR errors, the matching logic 348 may employ an algorithm (e.g., a fuzzy matching algorithm, a Levenshtein, edited distance algorithm, etc.) that tolerates a level of disparity between the extracted text and the reference text. Referring to the example in FIG. 7, the matching logic 348 may match the text "12'-6"" of the first sign to corresponding reference text, the text "NO PARKING 8 AM-4 PM SCHOOL DAYS" of the third sign to corresponding reference text, and the text "NO PARKING ANY TIME" of the fourth sign to corresponding reference text. In each case, one or more textual predictions of a MUTCD code may be produced, each having a respective confidence level.

In parallel (or in some implementations triggered subsequent to the step 620-630 in response to a lack of text, low confidence levels or other triggering case), the steps 640-650 may look to visual clues. At step 640, the keypoint matching logic 350 extracts image descriptors (e.g., SURF, SIFT, ORB, etc. descriptors) of graphics (if any) from the region (e.g., defined by the bounding box). For instance, referring to the example in FIG. 7, the keypoint matching logic 350 may extract no image descriptors 732 from the region 712 of the first sign, image descriptors 734 for a graphic of two stick figures walking from the region 714 of the second sign, image descriptors 736 for a rightwards-pointing arrow from the region 716 of the third sign, and image descriptors 738 for a leftwards-pointing arrow from the region 718 of the fourth sign. The image descriptors 734-738 are represented by images in FIG. 7 for illustration, however it should be understood that they typically take the form of vectors or other numeric data representations.

At step 650, for each region that has image descriptors, the key point matching logic 350 compares such image descriptors against reference image descriptors in the reference database 336 and returns one or more matches to produce one or more visual predictions of a specific technical name (e.g., MUTCD code) and a confidence level for each visual prediction. To improve efficiency, the key point matching logic 350 may leverage the already-predicted meta-classes and limit comparisons to image descriptors of signs in the reference database 336 that belong to the same meta-classes. In order to perform the comparison, any of a variety of keypoint matching algorithms, such as RANSAC, PROSAC, graph-cut RANSAC, FLANN, etc., may be used. The produced visual predictions and confidence levels may be provided to the prediction combination module 352. Referring to the example in FIG. 7, the key point matching logic 350 may match the image descriptors 734 for the graphic of two stick figures walking from the region 714 of the second sign to corresponding reference image descriptors, the image descriptors 736 for the rightwards-pointing arrow from the region 716 of the third sign to corresponding reference image descriptors, and the image descriptors 738 for the leftwards-pointing arrow from the region 718 of the fourth sign to corresponding reference image descriptors. In each case, one or more visual predictions of a MUTCD code may be produced, each having a respective confidence level.

At step 660, the prediction combination module 352 evaluates and combines the textual predictions (if any) and the visual predictions (if any) to produce one or more final predictions of the sign's specific technical name (e.g., MUTCD code) each with an overall confidence level. The prediction combination module 352 may combine predictions using a merging algorithm. If there is an intersection between the textual predictions and visual predictions (e.g., the same specific technical name (e.g., MUTCD code) is found in each), the merging algorithm may return the intersecting predictions. If there is no intersection, but there are one or more textual predictions or visual predictions that individually have a high confidence level (e.g., confidence level greater than a predetermine threshold), the merging algorithm may return these predictions. This may provide for cases where only one method can identify a sign (e.g., when there is no text present or no graphics present). If there is no intersection, and no textual predictions or visual predictions that individually have a high confidence level, but there are one or more coinciding textual predictions and visual predictions that in combination have a high confidence level (e.g., the sum or amalgam of confidence levels is greater than a predetermined threshold), the merging algorithm may return these predictions.

As mentioned above, in some implementations steps 640-650 may be triggered responsively subsequent to step 620-630 when there is a lack of text, low confidence levels or other trigger. It should be understood that in some implementations, to improve efficiency, the steps 640-650 may not be triggered. In such instances, the prediction combination module 352 may perform truncated operations, and simply use the textual predictions as the final predictions.

Referring to the example in FIG. 7, the merging algorithm of the prediction combination module 352 may select and return a textual prediction of MUTCD code "W12-2" as the final prediction 742 for the first sign since it has a high individual confidence level and there are no visual predictions, may return a visual prediction of MUTCD code "S1-1" as a final prediction 744 for the second sign since it has a high individual confidence level and there are no textual predictions, may return a final prediction of MUTCD code "R7-SA" as a final prediction 746 for the third sign based on a high combined confidence level of a textual prediction and visual prediction, and may return a final prediction of MUTCD code "R7-1" as a final prediction 748 for the fourth sign based on a high combined confidence level of a textual prediction and visual prediction.

At step 670, the sign detection and identification module 342 may output the position (e.g., represented by a bounding box) in the image of each sign determined by the ML detection model 344 and the specific technical name (e.g., MUTCD code) of each sign from the prediction combination module 352. The position in the image and the specific technical name may be combined with other information by the application software 340 to create an inventory of deployed signs with their geographical locations. For example, where the image is captured by a camera-equipped vehicle having instrumentation that records the position and orientation where the image was captured (e.g., the geographic coordinates and orientation of the camera), triangulation techniques may be used to determine the geographical locations of the signs. Alternatively, photogrammetry techniques may be used to reconstruct a three-dimensional (3D) model and positions of signs in the image mapped to the 3D model, or other techniques may be used to determine geographical locations.

Figure 8:
FIG. 8 is an example image from a foreign jurisdiction with a sign in a foreign language.
Figure 8:

The method of detection and identification of signs in images of FIG. 6 may be robust enough to provide meaningful results with little modification across jurisdictions (e.g., countries). The ML detection model 344 may retain at least some learning despite slightly different sign definitions. FIG. 8 is an example image 800 from a foreign jurisdiction (Quebec City) with a sign 810 in a foreign language (e.g., French). A U.S. trained ML detection model 344 may be able to still detect the sign and predict its meta-class without additional training. By simply updating the reference database 336 to include information of the appropriate official manual for the new jurisdiction, complete identification with a specific technical name may be achieved.

It should be understood that a wide variety of adaptations and modifications may be made to the above discussed techniques. While it is discussed above that the techniques may be used to detect signs and identify their specific technical names, the techniques may be readily adapted to detection of a variety of other physical objects and identification of a variety of different types of information about them. As such, it should be understood that where a sign is referred to above the teachings may be readily adapted to apply to another type of physical object, and where a specific technical name is referred to above the teachings may be readily adapted to yield other types of information.

For example, the techniques may be readily adapted to the detection and identification of equipment (e.g., heavy construction equipment) on a jobsite or elsewhere. Similar to signs, it may be desirable to create inventory of deployed equipment. The information identified about such equipment may include, similar to signs, its specific technical name (e.g., “Cat 336GC excavator”), or other types of information, for example capabilities or status. Meta-classes may define categories of similar appearing equipment (e.g., a meta-class for “large excavators”, “heavy-lift capable cranes”, etc.). Likewise, the techniques may be readily adapted for the detection and identification of vehicles on a roadway from images captured by traffic cameras. It may be desirable to identify the vehicles by their specific technical name (e.g., “Ford F150”), or to identify some other type of information about them. Meta-classes may define categories of similar appearing vehicles (e.g., a meta-class for “light trucks”, a meta-class for “electric vehicles”, etc.).

Further, at least portions of the techniques may be adapted for use with other types of tasks. For example, the use of an instance-aware, context-focused weakly-supervised object detection architecture (e.g., Wetectron architecture) and image-wise meta-class labeled training images may be adapted to sensor data analysis, detection and identification of 3D representations in point clouds, or other types of tasks.

Further, while various software modules that execute on particular computing devices are discussed above, it should be remembered that functionality may be implemented using a variety of different software, hardware, and various combinations thereof. Software implementations may include electronic device-executable instructions (e.g., computer-executable instructions) stored on non-transitory electronic device-readable media (e.g., a non-transitory computer-readable media), such as a volatile memory, a persistent storage device, or other tangible media. Hardware implementations may include logic circuits, application specific integrated circuits, and/or other types of hardware components. Further, combined software/hardware implementations may include both electronic device-executable instructions stored in a non-transitory electronic device-readable media, as well as one or more hardware components. Above all, it should be understood that the above description is meant to be taken only by way of example.

What is claimed is:

1. A method for detection and identification, comprising:

receiving, by software executing on one or more computing devices, an image that includes one or more signs;

predicting, by a trained machine learning (ML) detection model of the software, a position in the image and a meta-class of each of the one or more signs, wherein the meta-class predicted by the trained ML detection model is a class of objects having similar appearance but not all sharing a same Manual on Uniform Traffic Control Devices (MUTCD) code;

subsequent to the predicting, providing the predicted position and meta-class of each of the signs to one or more modules of the software that are separate from the trained ML detection model that predicted the position and meta-class, and producing, by the one or more modules of the software, one or more textual predictions, one or more visual predictions or both one or more textual predictions and one or more visual predictions of a specific technical name of each sign based on a comparison of text or graphics extracted from a region of the image at the position predicted for the sign and information for selected signs in a reference database, wherein the selected signs are those that share the same meta-class as that predicted for the sign;

combining any textual predictions and any visual predictions for each sign to produce one or more final predictions of each sign’s specific technical name, wherein the specific technical name produced by the combining any textual predictions and any visual predictions comprises a MUTCD code; and outputting, by the software, the position in the image and the specific technical name of each sign.

2. The method of claim 1, wherein the one or more modules of the software that are separate from the trained ML detection model include an object character recognition (OCR) module, and the producing produces each of the one or more textual predictions by:

extracting, using an OCR algorithm of the OCR module, text from the region of the image at the position; and comparing the extracted text to reference text of signs in the reference database that share the same meta-class as the sign.

3. The method of claim 2, wherein the comparing uses a fuzzy matching algorithm that tolerates a level of disparity between the extracted text and the reference text.

4. The method of claim 1, wherein the one or more modules of the software that are separate from the trained ML detection model include keypoint matching logic, and the producing produces each of the one or more visual predictions by:

extracting image descriptors of graphics from the region of the image at the position; and comparing, using a keypoint matching algorithm of the keypoint matching logic, the extracted image descriptors to reference image descriptors of signs in the reference database that share the same meta-class as the sign.

5. The method of claim 4, wherein the image descriptors are Speeded-Up Robust Features (SURF) image descriptors.

6. The method of claim 4, wherein the keypoint matching algorithm is a Random Sample Consensus (RANSAC) algorithm.

7. The method of claim 1, wherein the producing produces both one or more textual predictions and one or more visual predictions for each sign, and the combining uses a merging algorithm that returns an intersection between the one or more textual predictions and the one or more visual predictions.

8. The method of claim 7, wherein each textual prediction and each visual prediction is associated with a respective confidence level and the merging algorithm also returns a textual prediction or a visual prediction that individually has a confidence level greater than a predetermined threshold.

9. The method of claim 7, wherein each textual prediction and each visual prediction is associated with a respective confidence level and the merging algorithm also returns a coinciding textual prediction and visual prediction having respective confidence levels whose sum or amalgam is greater than a predetermined threshold.

10. The method of claim 1, wherein the image is a street-view image captured by a camera-equipped vehicle and the one or more signs are traffic signs.

11. A method for detection and identification, comprising:

receiving, by software executing on one or more computing devices, an image that includes a sign;

predicting, by a trained machine learning (ML) detection model of the software, a position in the image and a meta-class of the sign, wherein the meta-class predicted by the trained ML detection model is a class of objects having similar appearance but not all sharing a same Manual on Uniform Traffic Control Devices (MUTCD) code;

subsequent to the predicting, using one or more modules of the software that are separate from the trained machine learning (ML) detection model to:

extract text from the region of the image at the position predicted for the sign, compare the extracted text to reference text of only a subset of signs of a plurality of signs in a reference database, wherein the subset of signs of are those signs that share the same meta-class as predicted for the sign, to produce a textual prediction of a specific technical name of the sign, extract image descriptors of graphics from the region of the image at the position predicted for the sign, and compare the extracted image descriptors to reference image descriptors of only the subset of signs in the reference database that share the same meta-class as predicted for the sign, to produce a visual prediction of the specific technical name of the sign;

combining, by the software, the textual prediction of the specific technical name of the sign and the visual prediction of the specific technical name of the sign to produce a final prediction of the specific technical name of the sign, wherein the specific technical name produced by combining the textual prediction and the visual prediction comprises a MUTCD code; and outputting, by the software, the position in the image and the specific technical name of the sign.

12. The method of claim 11, wherein the combining uses a merging algorithm that returns an intersection between the textual prediction and the visual prediction.

13. The method of claim 12, wherein the textual prediction and the visual prediction are each associated with a respective confidence level and the merging algorithm returns a textual prediction or a visual prediction that individually has a confidence level greater than a predetermined threshold.

14. The method of claim 12, wherein the textual prediction and the visual prediction are each associated with a respective confidence level and the merging algorithm returns a coinciding textual prediction and visual prediction having respective confidence levels whose sum or amalgam is greater than a predetermined threshold.

* * * * *